United States Patent
Okamoto et al.

(10) Patent No.: US 10,319,317 B2
(45) Date of Patent: Jun. 11, 2019

(54) DISPLAY CONTROL DEVICE, DISPLAY DEVICE, METHOD FOR CONTROLLING DISPLAY CONTROL DEVICE, AND STORAGE MEDIUM

(71) Applicant: SHARP KABUSHIKI KAISHA, Sakai (JP)

(72) Inventors: Takuya Okamoto, Sakai (JP); Junki Asai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/576,977

(22) PCT Filed: Jul. 7, 2016

(86) PCT No.: PCT/JP2016/070188
§ 371 (c)(1),
(2) Date: Nov. 27, 2017

(87) PCT Pub. No.: WO2017/038249
PCT Pub. Date: Mar. 9, 2017

(65) Prior Publication Data
US 2018/0158424 A1    Jun. 7, 2018

(30) Foreign Application Priority Data
Aug. 31, 2015    (JP) ................. 2015-171370

(51) Int. Cl.
| | | |
|---|---|---|
| *G09G 3/36* | (2006.01) | |
| *G09G 5/391* | (2006.01) | |
| *G09G 5/00* | (2006.01) | |
| *H04N 5/63* | (2006.01) | |
| *H04N 7/01* | (2006.01) | |

(52) U.S. Cl.
CPC .......... *G09G 3/3611* (2013.01); *G09G 5/005* (2013.01); *G09G 5/008* (2013.01); *G09G 5/391* (2013.01);
(Continued)

(58) Field of Classification Search
CPC ......... G09G 2310/0264; G09G 3/3611; G09G 5/00; G09G 5/008; G09G 5/391;
(Continued)

(56) References Cited

U.S. PATENT DOCUMENTS

| | | | |
|---|---|---|---|
| 5,636,141 A | 6/1997 | Hiramatsu | |
| 7,110,025 B1 * | 9/2006 | Loui | H04N 5/232 348/220.1 |

(Continued)

FOREIGN PATENT DOCUMENTS

| | | |
|---|---|---|
| JP | 7-222096 A | 8/1995 |
| JP | 2001-346202 A | 12/2001 |

(Continued)

*Primary Examiner* — Dmitriy Bolotin
(74) *Attorney, Agent, or Firm* — ScienBiziP, P.C.

(57) ABSTRACT

The present invention provides a display control device and a display device each of which can reduce electric power consumption by switching a resolution of image data to be displayed. In a case of transferring image data having a 4k resolution, an image transferring section (12) transfers the image data to a display driver (20) via a first lane and a second lane. In a case of transferring image data having an FHD resolution, the image transferring section (12) stops operation of the first lane and transfers the image data to the display driver (20) via the second lane.

13 Claims, 11 Drawing Sheets

(52) U.S. Cl.
CPC . *G09G 2310/0264* (2013.01); *G09G 2340/02* (2013.01); *G09G 2340/0435* (2013.01); *G09G 2360/02* (2013.01); *G09G 2360/18* (2013.01); *H04N 5/63* (2013.01); *H04N 7/01* (2013.01)

(58) Field of Classification Search
CPC .............. G09G 5/005; G09G 2340/02; G09G 2340/0435; G09G 2360/02; G09G 2360/18; H04N 5/63; H04N 7/01
See application file for complete search history.

(56) References Cited

U.S. PATENT DOCUMENTS

| | | | | |
|---|---|---|---|---|
| 2002/0005863 | A1* | 1/2002 | Nagai | G09G 5/006 345/698 |
| 2004/0008253 | A1* | 1/2004 | Monroe | G08B 13/19641 348/143 |
| 2005/0163402 | A1* | 7/2005 | Aiso | G06T 3/4069 382/300 |
| 2009/0135252 | A1* | 5/2009 | Matsuda | G08B 13/19656 348/143 |
| 2010/0265350 | A1* | 10/2010 | Ogasawara | H04N 5/3765 348/222.1 |

FOREIGN PATENT DOCUMENTS

| | | |
|---|---|---|
| JP | 2011-133605 A | 7/2011 |
| JP | 2012-163621 A | 8/2012 |
| JP | 2013-120204 A | 6/2013 |
| JP | 2013-198025 A | 9/2013 |
| JP | 2014-077993 A | 5/2014 |

* cited by examiner

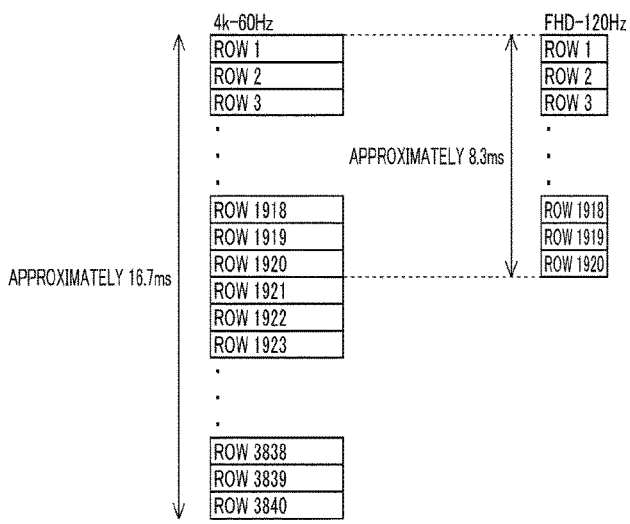

FIG. 12

| FHD(1920×1080) | COLUMN 1 COLUMN 271 | ... B1 | COLUMN 270 COLUMN 540 | 271 2431 | | | | | 1080 3240 | COLUMN 541 COLUMN 811 | ... B2 | COLUMN 810 COLUMN 1080 | 1081 3241 | 1351 3511 | | | | | |
|---|---|---|---|---|---|---|---|---|---|---|---|---|---|---|---|---|---|---|---|
| ROW 1 | 1 | | 270 | | | | | | | | | | | | | | | | 2160 |
| ROW 1 | 2161 | | 2430 | | | | | | | | | | | | | | | | 4320 |
| ROW 2 | | | | | | | | | | | | | | | | | | | |
| ROW 960 | 4145041 | | 4145310 | | | | | | | 4146121 | | 4146390 | | | | | | | 4147200 |
| ROW 961 | 4147201 | | | | | | | | | | | | | | | | | | |
| ROW 1920 | 8292241 | | 8292510 | | | | | | | 8292781 | | 8293050 | | | | | | | 8294400 |
| ROW 1920 | | | | | | | | | | | | | | | | | | | |

DISPLAY CONTROL DEVICE, DISPLAY DEVICE, METHOD FOR CONTROLLING DISPLAY CONTROL DEVICE, AND STORAGE MEDIUM

TECHNICAL FIELD

The present invention relates to a display control device and a display device.

BACKGROUND ART

In recent years, there has been developed a display panel that can display 4 k (3840×2160 pixels) or 8 k (7680×4320 pixels) videos, which are higher in resolution than full high definition (FHD) (1920×1080 pixels) videos. Patent Literature 1 discloses a technique in which, in a case where FHD image data is converted into 4 k image data, (i) a resolution conversion in a given region is carried out by a second resolution processing circuit and (ii) a resolution conversion in a region other than the given region is carried out by a first resolution processing circuit.

CITATION LIST

Patent Literature

[Patent Literature 1]
Japanese Patent Application Publication Tokukai No. 2014-077993 (Publication Date: May 1, 2014)

SUMMARY OF INVENTION

Technical Problem

Such a conventional technique, however, gives no consideration for reducing electric power consumed in a case where a display device including a high resolution display panel displays image data having a lower resolution (i.e., FHD).

An object of the present invention is to realize a display control device and a display device each of which can reduce electric power consumption by switching a resolution of image data which is to be displayed on the display device including a high resolution display panel.

Solution to Problem

A display control device in accordance with an aspect of the present invention includes: a display driver; an image transferring section configured to transfer image data to the display driver; and a first transmission line and a second transmission line each of which connects the display driver with the image transferring section, in a case of transferring image data having a first resolution, the image transferring section transferring the image data having the first resolution to the display driver via the first transmission line and the second transmission line, and in a case of transferring image data having a second resolution which is lower than the first resolution, the image transferring section (i) stopping operation of the first transmission line and (ii) transferring the image data having the second resolution to the display driver via the second transmission line.

A method of controlling a display control device in accordance with an aspect of the present invention is a method of controlling a display control device which includes (i) a display driver, (ii) an image transferring section configured to transfer image data to the display driver, and (iii) a first transmission line and a second transmission line each of which connects the display driver with the image transferring section, in which: in a case where image data having a first resolution is transferred, the image data having the first resolution is transferred from the image transferring section to the display driver via the first transmission line and the second transmission line; and in a case where image data having a second resolution which is lower than the first resolution is transferred, operation of the first transmission line is stopped and the image data having the second resolution is transferred from the image transferring section to the display driver via the second transmission line.

Advantageous Effects of Invention

An aspect of the present invention makes it possible to reduce electric power consumption by switching a resolution of image data which is to be displayed.

BRIEF DESCRIPTION OF DRAWINGS

FIG. 4 is a view illustrating an example of how memory regions in accordance with Embodiment 1 are related to image data having a 4 k resolution.

FIG. 5 is a view illustrating an example of how the memory regions in accordance with Embodiment 1 are related to image data having an FHD resolution.

FIG. 6 is a view illustrating a timing at which a reading section in accordance with Embodiment 1 reads out data.

FIG. 12 is a view illustrating an example of how memory regions in accordance with Embodiment 3 are related to image data B having the FHD resolution.

DESCRIPTION OF EMBODIMENTS

Embodiment 1

(Configuration of Display Device 1)

Figure 1:
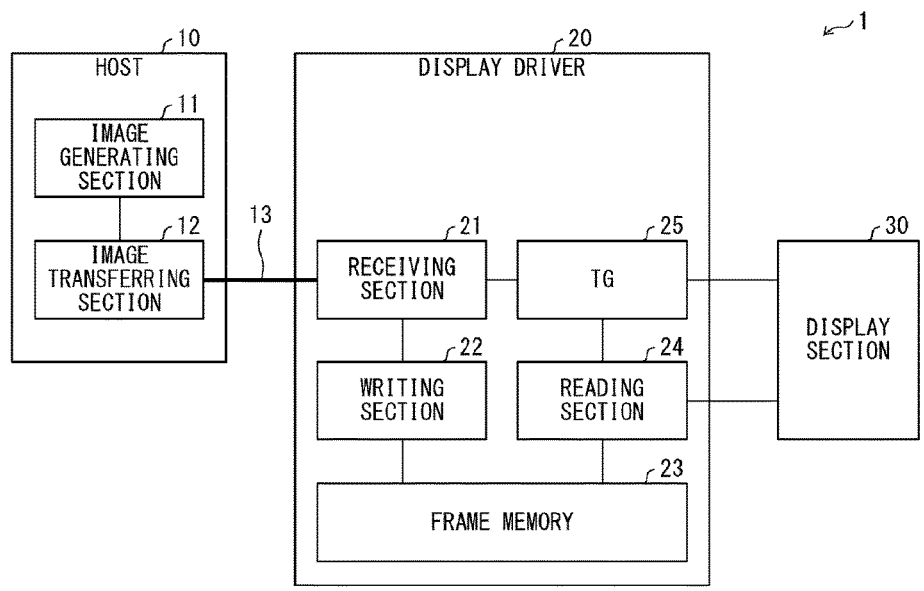
FIG. 1 is a block diagram illustrating a display device in accordance with Embodiment 1 of the present invention.

FIG. 1 is a block diagram illustrating a configuration of a display device 1 in accordance with Embodiment 1. The display device 1 includes a host 10, a communication connecting section 13, a display driver 20, and a display section 30. The host 10, the communication connecting section 13, and the display driver 20 serve as a display control device that controls display operation of the display section 30. Note that, though Embodiment 1 will discuss an example in which the display device 1 is a mobile terminal, the display device 1 is not limited to such an example. Alternatively, the display device 1 can be an installation-type display device.

The host 10 includes an image generating section 11 and an image transferring section 12. The host 10 corresponds to a host of the mobile terminal. The image generating section 11 generates image data which is to be displayed on the display section 30. The image data as used herein refers to one-frame image data which is to be displayed on the display section 30, unless otherwise particularly noted.

The image generating section 11 generates image data by executing various applications that operate in the mobile terminal. The image data thus generated has a resolution and a frame rate each of which can vary depending on (i) an application and (ii) a content of a process carried out by the application. The image generating section 11 supplies the image data to the image transferring section 12. Furthermore, the image generating section 11 determines an input mode, which indicates a resolution and a frame rate, and notifies the image transferring section 12 of information indicative of the resolution and the frame rate.

The image transferring section 12 transfers (transmits), at a timing corresponding to the frame rate of the image, the image data to the display driver 20 via the communication connecting section 13. The image transferring section 12 controls the communication connecting section 13 to operate in the input mode which has been determined. The input mode is a mode related to an input of image data to the display driver 20. The image transferring section 12 notifies the display driver 20 of the input mode via the communication connecting section 13 with use of, for example, a command. The image transferring section 12 supplies the communication connecting section 13 with electric power, and controls operation of the communication connecting section 13.

The communication connecting section 13 includes a plurality of parallel transmission lines for connecting the image transferring section 12 with the display driver 20 (specifically, receiving section 21). Each of the plurality of transmission lines is a line (e.g., a wire or an optical fiber) for signal transfer. Embodiment 1 will discuss an example in which the communication connecting section 13 is a communication interface that meets the mobile industry processor interface (MIPI (registered trademark)) standard. The communication interface is, however, not limited to such specifications, and it is sufficient that the communication connecting section 13 includes a plurality of transmission lines. The communication connecting section 13 includes a plurality of (in Embodiment 1, two) transmission channels (i.e., first and second transmission channels), each of which includes a plurality of (in Embodiment 1, four) lanes (i.e., transmission lines) for data transfer. That is, the communication connecting section 13 in accordance with Embodiment 1 includes eight lanes in total. Note that the communication connecting section 13 can further include another line that is used to transmit a control signal (e.g., clock or command) other than image data.

The display driver 20 includes the receiving section 21, a writing section 22, a frame memory 23, a reading section 24, and a TG 25. The display driver 20 supplies, to the display section 30, a driving signal for driving the display section 30, together with the image data received from the host 10. The display driver 20 thus controls the display section 30 to display an image indicated by the image data.

The receiving section 21 receives image data from the image transferring section 12 via the communication connecting section 13, and supplies the image data thus received to the writing section 22. The receiving section 21 notifies the TG 25 of the input mode notified by the image transferring section 12. The receiving section 21 transmits a tearing effect (TE) signal, which has been received from the TG 25, to the image transferring section 12 via the communication connecting section 13.

The writing section 22 writes, into the frame memory 23, the image data which has been received. In accordance with a timing instructed by the TG 25, the reading section 24 (i) reads out the image data from the frame memory 23 and (ii) supplies the image data thus read out to the display section 30. The frame memory 23 is a video random access memory (VRAM) that can store one-frame image data having a maximum resolution (in Embodiment 1, 4 k resolution). The frame memory 23 can be, for example, a static random access memory (SRAM), a dynamic random access memory (DRAM), or an embedded DRAM (eDRAM).

The TG 25 (timing generator) determines an output mode in accordance with the input mode. The output mode is a mode related to an output of image data to the display section 30, and indicates a resolution and a frame rate of image data. The TG 25 generates various timing signals in accordance with the output mode. The TG 25 generates a driving signal (e.g., vertical synchronization signal, horizontal synchronization signal, or clock signal) for driving the display section 30, and supplies the driving signal thus generated to the display section 30. Furthermore, in accordance with a display update (refresh) carried out on the display section 30, the TG 25 gives the reading section 24 an instruction on a timing to read out image data from the frame memory 23. The TG 25 also generates a TE signal in accordance with the input mode and the output mode, and supplies the TE signal thus generated to the receiving section 21. The TE signal (i.e., transmission timing signal) is a signal for instructing the host 10 to start transfer of image data corresponding to a subsequent frame.

The display section 30 includes a plurality of pixels the number of which corresponds to a maximum resolution of the display device 1. The display section 30 displays, in accordance with image data and a driving signal supplied thereto, an image indicated by the image data. The display section 30 can be, for example, a liquid crystal display, an organic electroluminescence (EL) display, a plasma display, a field emission display, or a micro electro mechanical systems (MEMS) display. Here, Embodiment 1 will discuss an example in which (i) the maximum resolution of the display device 1 is 4 k and (ii) the display section 30 is a vertically-long display. The display section 30 includes 2160 columns of data signal lines (i.e., source signal lines) and 3840 rows of scanning signal lines (i.e., gate signal lines).

(Timing Chart of Image Data Transfer)

Figure 2:
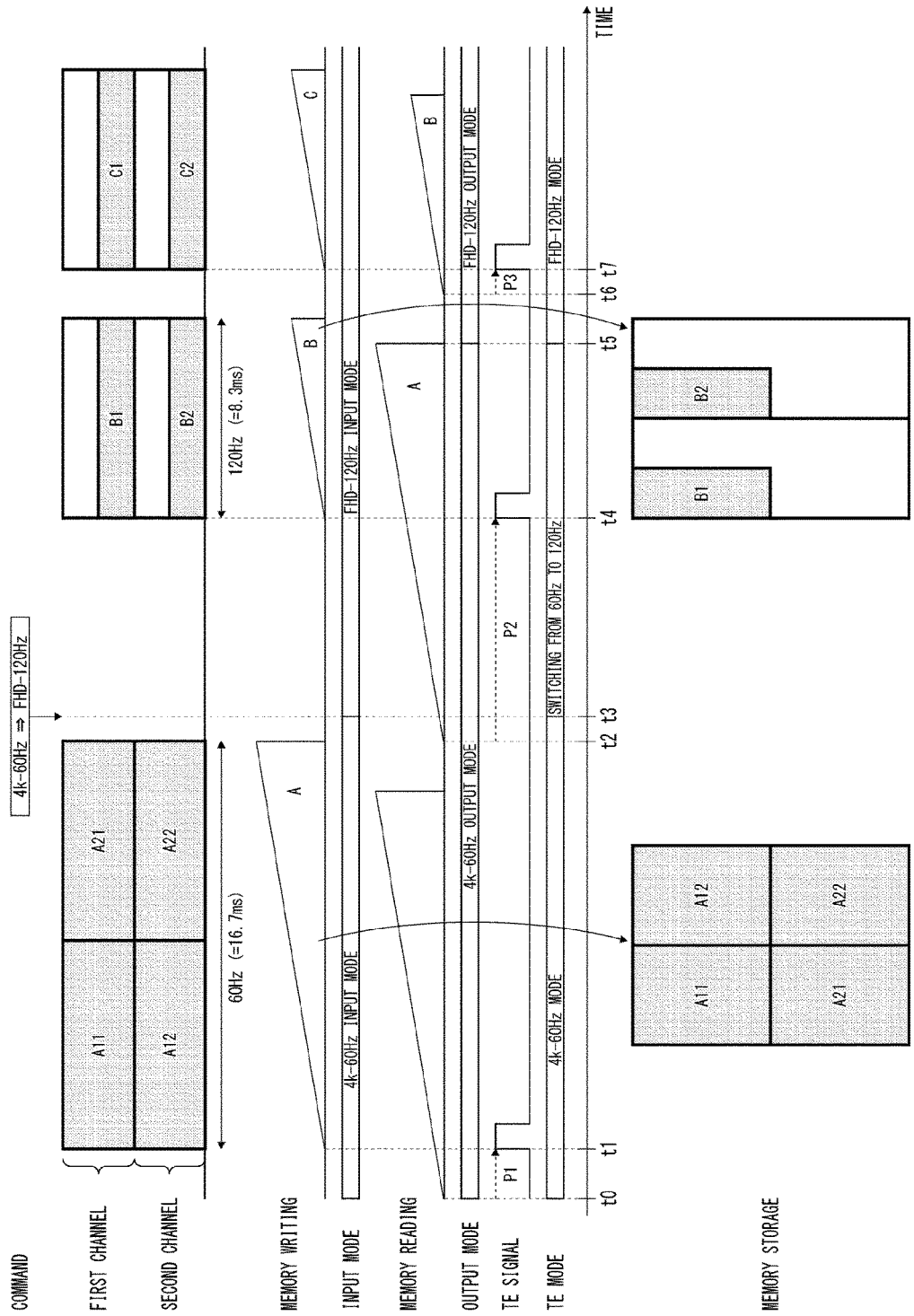
FIG. 2 is a view illustrating examples, in accordance with Embodiment 1, of timings of (i) transferring image data, (ii) writing the image data into a frame memory, and (iii) reading out the image data from the frame memory.
Figure 3:
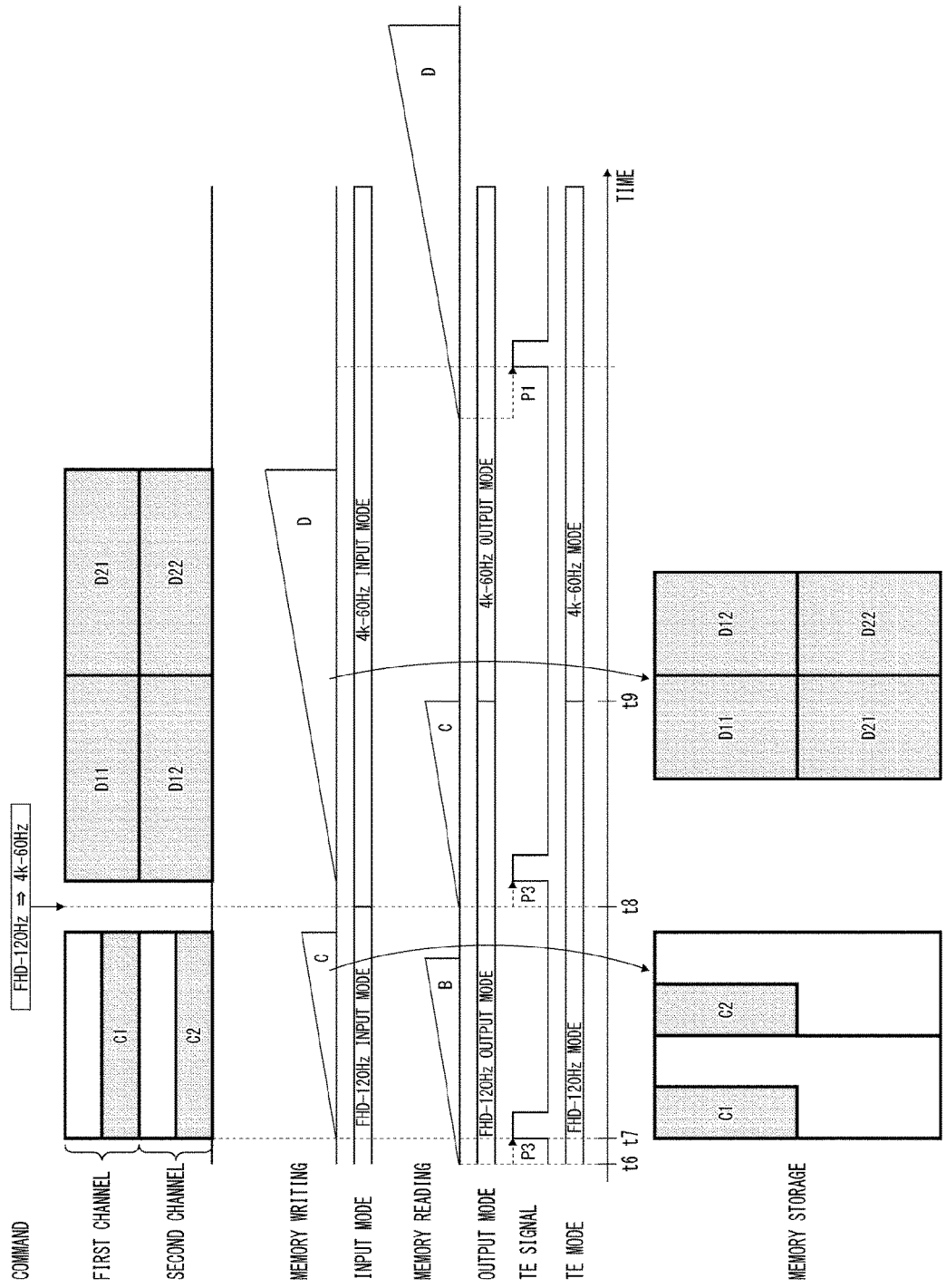
FIG. 3 is a view which is continued from FIG. 2 and illustrates examples of the timings of (i) transferring the image data, (ii) writing the image data into the frame memory, and (iii) reading out the image data from the frame memory.

FIG. 2 is a view illustrating examples of timings of (i) transferring image data, (ii) writing the image data into the frame memory 23, and (iii) reading out the image data from the frame memory 23. FIG. 3 is a view which is continued from FIG. 2 and illustrates examples of the timings of (i) transferring the image data, (ii) writing the image data into the frame memory 23, and (iii) reading out the image data from the frame memory 23. Each of FIGS. 2 and 3 shows the following indications: that is, a horizontal axis indicates time; "COMMAND" indicates a command which is given from the host 10 to the display driver 20 to switch the input mode; "FIRST CHANNEL" and "SECOND CHANNEL" correspond to respective two transmission channels of the communication connecting section 13 and each indicate data to be transferred therethrough; "MEMORY WRITING" indicates writing of image data, which has been transferred from the image transferring section 12, into the frame memory 23, and a vertical axis in "MEMORY WRITING" indicates a location (i.e., memory address) on the frame memory 23 at which location a writing pointer is writing image data; "MEMORY READING" indicates reading-out of image data from the frame memory 23, and a vertical axis in "MEMORY READING" indicates a location (i.e., memory address) on the frame memory 23 at which location a reading pointer is reading out image data; "TE SIGNAL" indicates a pulse of a TE signal to be transmitted from the display driver 20 to the host 10; and "MEMORY STORAGE" indicates an example of memory regions of the frame memory 23 in which memory regions pieces of data are to be stored.

Until a time point t0, image data is transferred in the resolution of 4 k and at a frame rate of 60 Hz. The reading section 24 starts reading out image data from the frame memory 23 at the time point t0. At the time point t0, the display driver 20 is in an input mode of "4 k-60 Hz" and in an output mode of "4 k-60 Hz". In a case where the input mode and the output mode are thus identical, the TG 25 sets a TE mode to be identical to the input mode and the output mode. When a period P1, which corresponds to the TE mode, has elapsed from start of reading out the image data, the TG 25 generates a TE signal. By thus waiting for an elapse of the given period P1, it is possible to prevent tearing which may occur in a case where the writing pointer overtakes the reading pointer.

At a timing at which a pulse of the TE signal rises, the image transferring section 12 starts transferring, to the receiving section 21, image data A corresponding to a subsequent frame. The image data A which is for one (1) frame and has the 4 k resolution is constituted by pieces of data A11, A12, A21, and A22. The pieces of data A11 and A21 are sequentially transferred to the receiving section 21 via four lanes of the first channel. The pieces of data A12 and A22 are sequentially transferred to the receiving section 21 via four lanes of the second channel. Pieces of data constituting the image data A received by the receiving section 21 are sequentially stored in the frame memory 23 by the writing section 22. For example, leading parts of the respective pieces of data A11 and A12 received immediately after a time point t1 are stored in respective uppermost rows of memory regions indicated in "MEMORY STORAGE". Note also that reading-out of the image data A is sequentially carried out from the top of the memory regions. Numerals of respective memory addresses increase toward the bottom of the memory regions. In a case where the frame rate is 60 Hz, transfer of the image data A for one (1) frame is completed in approximately 16.7 ms.

The reading section 24 starts reading out the image data A from the frame memory 23 at a time point t2, and the image data A is then displayed on the display section 30.

Here, it is assumed that the display driver 20 receives, at a time point t3 at which the image data A is being read out, a command from the host 10 for changing the input mode from "4 k-60 Hz" to "FHD-120 Hz". Upon receipt of the command, the TG 25 immediately switches the input mode of the display driver 20 to "FHD-120 Hz". Meanwhile, the TG 25 switches the output mode to "FHD-120 Hz" after (i) reading-out of the image data A is completed and (ii) the TG 25 receives a video start signal for image data B, which corresponds to a subsequent frame, from the image transferring section 12 via the receiving section 21. As such, there exists a period from t3 to t5 during which the input mode and the output mode do not match each other. In the period from t3 to t5 during which the input mode is higher in frame rate than the output mode, the TG 25 sets the TE mode to "SWITCHING FROM 60 Hz TO 120 Hz". When a period P2, which corresponds to the TE mode of "SWITCHING FROM 60 Hz TO 120 Hz", has elapsed (at a time point t4) from start of reading out the image data A, the TG 25 generates a TE signal. The period P2 is longer than the period P1. Here, the period P2 is equal to or longer than $1/120$ seconds. When (i) a resolution is switched from a first resolution to a second resolution and (ii) a frame rate is switched from a first frame rate to a second frame rate which is G (G>1) times the first frame rate, the TG 25 reads out (1−1/G) of image data which has the first resolution and is stored in the frame memory 23, and then transmits the TE signal to the image transferring section 12. That is, in a case where the frame rate is switched to a higher one, the TG 25 delays a timing at which the TE signal is generated and transmitted, as compared with a case where the frame rate is constant.

In a case where the input mode is "FHD-120 Hz", the image transferring section 12 stops (suspends) operation of some (in Embodiment 1, a half) of the total of eight lanes of the communication connecting section 13. Specifically, the image transferring section 12 stops power supply to some of the lanes of the communication connecting section 13, and thereby suspends operation of the some of the lanes. In Embodiment 1, operation of two lanes out of the four lanes of the first channel is suspended, and operation of two lanes out of the four lanes of the second channel is suspended. Note, however, that Embodiment 1 is not limited to this, and the some of the lanes whose operation is to be suspended can be arbitrarily selected. For example, it is possible to (i) control all lanes of the first channel to operate and (ii) suspend operation of all lanes of the second channel. Note here that one-frame image data having the FHD resolution is one-fourth in size of the image data A having the 4 k resolution. In a case where the input mode is switched from "4 k-60 Hz" to "FHD-120 Hz", the frame rate increases twofold whereas a size of the image data is reduced to one-fourth, and consequently an amount of data transferred per unit time is reduced by half. This makes it possible to appropriately transfer image data even in a case where operation of a half of all lanes is suspended. It is therefore possible to reduce electric power that would be consumed by lanes whose operation is suspended. This consequently makes it possible to reduce electric power consumed by an entire system of the display device 1, including electric power consumed by the image generating section 11 and the like.

Upon receipt of the TE signal at the time point t4, the image transferring section 12 (i) transmits a video start signal (e.g., RAM writing packet or vertical synchronization packet) to the receiving section 21 and (ii) starts transferring the image data B which corresponds to a subsequent frame and has the FHD resolution. The image data B is constituted by pieces of data B1 and B2. The data B1 is transferred to the receiving section 21 via two lanes of the first channel. The data B2 is transferred to the receiving section 21 via two lanes of the second channel. Pieces of data constituting the image data B received by the receiving section 21 are sequentially stored in the frame memory 23 by the writing section 22. In a case where the image data B having the FHD resolution is stored in the frame memory 23, three-fourths of the memory regions of the frame memory 23 becomes empty. In this case, the frame memory 23 does not compactly store the image data B in an order of memory addresses but stores the image data B while skipping some of the memory addresses as illustrated in FIG. 2. How the frame memory 23 stores the image data B will be discussed later in detail. In a case where the frame rate is 120 Hz, transfer of the image data B is completed in approximately 8.3 ms.

After completion of reading-out of the image data A in the input mode of "FHD-120 Hz", the frame memory 23 stops memory retaining operation in some of the memory regions in which the image data B is not to be stored. Specifically, the frame memory 23 stops (i) power supply to the some of the memory regions, (ii) supply of a clock signal to the some of the memory regions, or (iii) refresh operation in the some of the memory regions, so as to stop the memory retaining operation in that some of the memory regions.

The reading section 24 starts reading out the image data B from the frame memory 23 at a time point t6, and the image data B is then displayed on the display section 30. The TG 25 generates a timing signal at a timing corresponding to the output mode of "FHD-120 Hz", and drives the display section 30 at a refresh rate of 120 Hz. When a period P3, which corresponds to a TE mode of "FHD-120 Hz", has elapsed from start (at the time point t6) of reading out the image data B, the TG 25 generates a TE signal (at a time point t7). The period P3 is equal to or shorter than the period P1. Upon receipt of the TE signal (at the time point t7), the image transferring section 12 starts transferring image data C which corresponds to a subsequent frame and has the FHD resolution. The image data C is constituted by pieces of data C1 and C2. The image data C is transferred and stored in the frame memory 23 in a manner similar to that for the image data B.

Here, it is assumed that, at a time point t8, the display driver 20 receives, from the host 10, a command to switch the input mode from "FHD-120 Hz" to "4 k-60 Hz". Upon receipt of the command, the TG 25 immediately switches the input mode of the display driver 20 to "4 k-60 Hz". Meanwhile, the TG 25 switches the output mode to "4 k-60 Hz" after reading-out of the image data C, which is stored in the frame memory 23 and has the FHD resolution, is completed (at a time point t9). As such, there exists a period from t8 to t9 during which the input mode and the output mode do not match each other. In the period from t8 to t9 during which the input mode is lower in frame rate than the output mode, the TG 25 sets the TE mode to "FHD-120 Hz" which is higher in frame rate than "4 k-60 Hz". When the period P3, which corresponds to the TE mode of "FHD-120 Hz", has elapsed from start of reading out the image data C, the TG 25 generates a TE signal. Upon receipt of the TE signal, the image transferring section 12 starts transferring image data D which corresponds to a subsequent frame and has the 4 k resolution. The image data D is constituted by pieces of data D11, D12, D21, and D22. The image data D is transferred and stored in the frame memory 23 in a manner similar to that for the image data A.

(Storage in Frame Memory)

FIG. 4 is a view illustrating an example of how the memory regions are related to the image data A having the 4 k resolution. In FIG. 4, each of regions enclosed in respective boxes is a memory region of the frame memory 23, and numerals given in respective memory regions represent memory addresses. For convenience, the following description will assume that (i) the memory addresses start from 1 and (ii) a region indicated by one (1) memory address stores data for one (1) pixel. FIG. 4 illustrates in detail "MEMORY STORAGE" illustrated in FIGS. 2 and 3.

Pieces of pixel data for respective columns 1 through 2160 in a row 1 of an image having the 4 k resolution are stored, in an order of memory addresses, in respective regions to which memory addresses 1 through 2160 are assigned. Similarly, pieces of pixel data of a row 2 and subsequent rows of the image are also stored in the order of memory addresses, without skip of any memory address. An upper-left part (i.e., columns 1 through 1080 in rows 1 through 1920) of the image corresponds to the data A11. An upper-right part (i.e., columns 1081 through 2160 in rows 1 through 1920) of the image corresponds to the data A12. A lower-left part (i.e., columns 1 through 1080 in rows 1921 through 3840) of the image corresponds to the data A21. A lower-right part (i.e., columns 1081 through 2160 in rows 1921 through 3840) of the image corresponds to the data A22. Note that the frame memory 23 can include a surplus region that is not used.

FIG. 5 is a view illustrating an example of how the memory regions are related to the image data B having the FHD resolution. The way of viewing FIG. 5 is the same as that for FIG. 4. Pieces of pixel data in respective columns 1 through 540 in a row 1 of an image having the FHD resolution are stored, in the order of memory addresses, in the respective regions to which the memory addresses 1 through 540 are assigned. Meanwhile, the regions to which the respective memory addresses 541 through 1080 are assigned are skipped, and thus no data is stored in those regions. Pieces of pixel data in respective columns 541 through 1080 in the row 1 of the image are stored in the respective regions to which the memory addresses 1081 through 1620 are assigned. The regions to which the respective memory addresses 1621 through 2160 are assigned are skipped, and thus no data is stored in those regions. Similarly, pieces of pixel data of a row 2 and subsequent rows of the image are stored in the frame memory 23, while skipping some memory addresses. By thus skipping some of the memory addresses, pieces of pixel data in the lowermost row 1920 of the image data B are stored at a position corresponding to pieces of pixel data in the lowermost row 1920 of an upper-half of the image data A. A left-half (i.e., columns 1 through 540 in rows 1 through 1920) of the image corresponds to the data B1. A right-half (i.e., columns 541 through 1080 in rows 1 through 1920) of the image corresponds to the data B2.

As described above, the frame memory 23 stores pieces of pixel data of a lowermost row of the image having the second resolution at a position corresponding to pieces of pixel data of the (E/F)th row of an image having the first resolution. Note here that (i) a frame rate of image data having the second resolution is assumed to be F times that of image data having the first resolution, and (ii) E is assumed to be the number of rows of pixels in the image having the first resolution.

The data B1 transferred via the first channel of the communication connecting section 13 is stored in some of the memory regions in which the data A11 that is also transferred via the first channel is to be stored. The data B2 transferred via the second channel of the communication connecting section 13 is stored in some of the memory regions in which the data A12 that is also transferred via the second channel is to be stored. Note that the writing section 22 is capable of concurrently writing (i) data received via the first channel and (ii) data received via the second channel into corresponding memory regions. Furthermore, even in a case where the resolution is changed, the writing section 22 maintains (i) an association between the first channel and memory regions into which data transferred via the first channel is written and (ii) an association between the second channel and memory regions into which data transferred via the second channel is written. Note also that a leading memory address of memory regions, in which respective pieces of pixel data of each row of an image are stored, does not vary depending on a resolution of the image. That is, pixel data of an nth row of an image having the FHD resolution is stored in a memory region in which pixel data of an nth row of an image having the 4 k resolution is to be stored. This allows the writing section 22 to write image data into the frame memory 23 by similar operation, even in a case where a resolution of the image data changes. It is therefore possible to reduce a circuit scale of the writing section 22 that is compatible with two different resolutions.

In FIG. 5, each hatched region indicates a memory region into which image data is to be written, and each unhatched region indicates a memory region into which no image data is to be written. In a case where the image data B having the FHD resolution is stored in the frame memory 23, the writing section 22 causes the image data B to be stored in the frame memory 23 such that memory regions which are not used in the FHD resolution become continuous. In a case of storing the image data B having the FHD resolution, the frame memory 23 stops memory retaining operation in, out of all memory regions which are used in the 4 k resolution, memory regions (i.e., unhatched regions) which are not used in the FHD resolution. This makes it possible to reduce electric power consumed by the frame memory 23 while the display driver 20 is operating in the FHD resolution mode. In a case of storing image data having the 4 k resolution again, the frame memory 23 resumes the memory retaining operation in the memory regions whose operation has been suspended.

Note that, in a case where both of the input mode and the output mode are "FHD-120 Hz", the image transferring section 12 can (i) suspend operation of all the lanes of the second channel of the communication connecting section 13 and (ii) transfer the pieces of data B1 and B2 via the four lanes of the first channel of the communication connecting section 13. In such a case, the writing section 22 can write the pieces of data B1 and B2 into the memory region in which the data A11 is to be stored. This makes it possible to maintain an association between (i) the first channel and (ii) memory regions into which data transferred via the first channel is written.

It is also possible to cause the image data B having the FHD resolution to be stored in the frame memory 23 without skipping some of the memory addresses. In such a case, the image data B having the FHD resolution is stored in upper one-fourth (i.e., memory addresses 1 through 2073600) of the memory regions illustrated in FIG. 5. In such a case, in order to avoid tearing which may occur when the resolution is switched from the FHD resolution to the 4 k resolution, the TG 25 needs to transmit a TE signal after the elapse of a period longer than the period P3.

FIG. 6 is a view illustrating a timing at which the reading section reads out data. In the output mode of "FHD-120 Hz", (i) the number of rows of pixels in an image is a half and (ii) a period during which one-frame image data is read out is a half, as compared with the output mode of "4 k-60 Hz". It follows that a period during which data for one (1) row is read out does not vary even in a case where the output mode is changed. This allows the reading section 24 to read out data of each row by similar operation, regardless of the output mode. It is therefore possible to reduce a circuit scale of the reading section 24 that is compatible with two different resolutions.

Note that the reading section 24 can concurrently read out the pieces of data A11 and A12 from the frame memory 23. Similarly, the reading section 24 can concurrently read out the pieces of data B1 and B2 from the frame memory 23. Note also that the image data B which has been read out and has the FHD resolution is enlarged by an arbitrary method so that the image data B is displayed on the display section 30 having the 4 k resolution. Examples of a method of enlarging image data include a simple enlargement method and an interpolation enlargement method. Alternatively, it is possible to write data of one (1) pixel in an image into four pixels (2 columns×2 rows) of the display section 30, instead of enlarging image data that is transmitted to the display section 30.

(Flowchart of Process Carried Out from Image Generation to Image Display)

Figure 7:
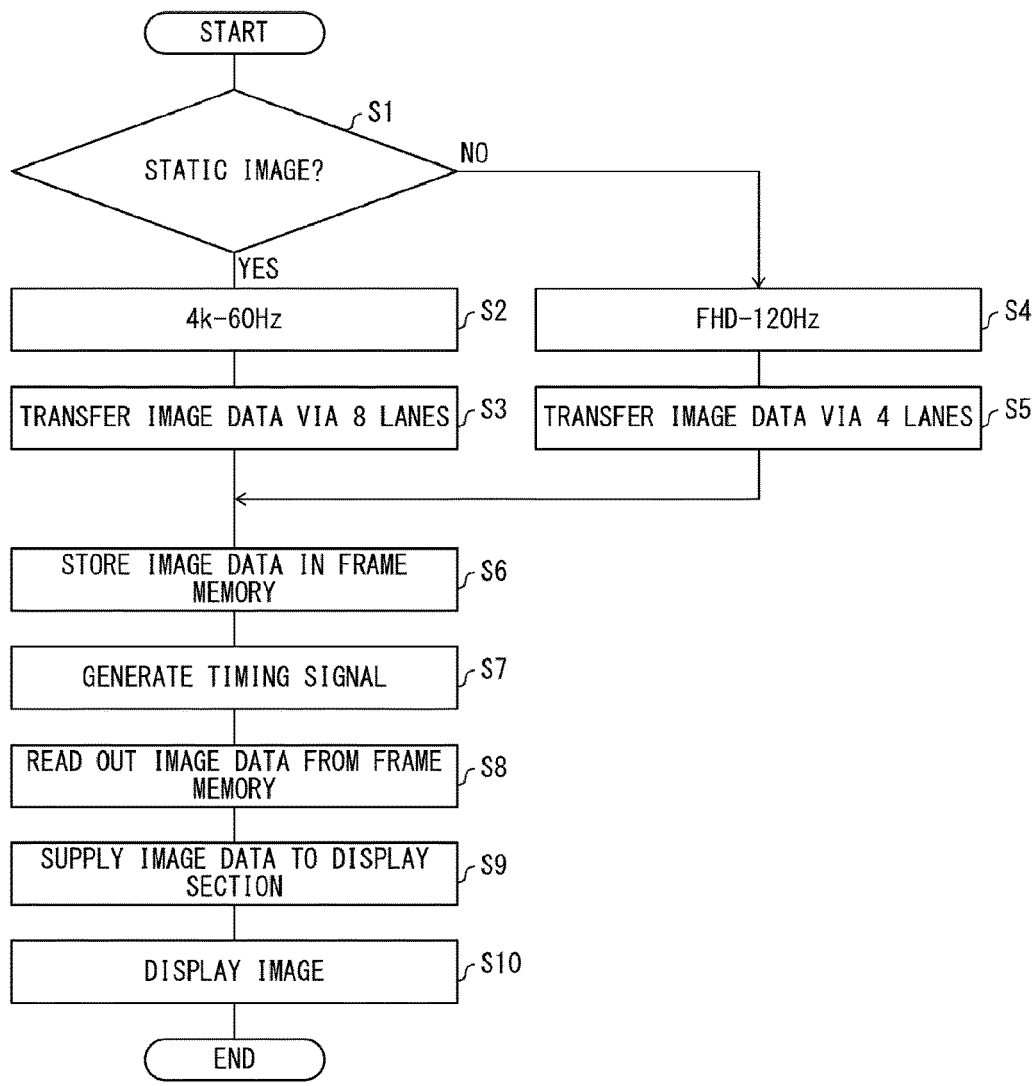
FIG. 7 is a flowchart of a process carried out from generation of image data to display of the image data in accordance with Embodiment 1.

FIG. 7 is a flowchart of a process carried out from generation of image data to display of the image data. The image generating section 11 determines whether an image to be displayed is a still image or a moving image (S1), and changes a resolution of the image in accordance with a result of the determination. In Embodiment 1, the image generating section 11 also changes a frame rate in accordance with the resolution.

In a case where the display section 30 is controlled to display a still image (YES in S1), the image generating section sets the input mode to "4 k-60 Hz" (S2). The image generating section 11 then generates image data having the 4 k resolution at a frame rate of 60 Hz, and supplies the image data thus generated to the image transferring section 12. In a case where the input mode is "4 k-60 Hz", the image transferring section 12 transfers the image data to the receiving section 21 via eight lanes (S3).

In a case where the display section 30 is controlled to display a moving image (NO in S1), the image generating section 11 sets the input mode to "FHD-120 Hz" (S4). The image generating section 11 then generates image data having the FHD resolution at a frame rate of 120 Hz, and supplies the image data thus generated to the image transferring section 12. In a case where the input mode is "FHD-120 Hz", the image transferring section 12 suspends operation of a half of the lanes, and transfers the image data to the receiving section 21 via four lanes (S5).

After the step S3 or S5, the receiving section 21 supplies, to the writing section 22, the image data which has been received. The writing section 22 causes the image data thus received to be stored in the frame memory 23, in a manner according to the input mode (or resolution) (S6). The TG 25 generates various timing signals in accordance with the output mode (S7), and gives the reading section 24 an instruction on a timing of reading out the image data from the frame memory 23. The reading section 24 reads out the image data from the frame memory 23 (S8), and supplies (transfers) the image data thus read out to the display section 30 (S9). The display section 30 displays an image indicated by the image data thus received (S10). Note that the image data to be transferred from the image transferring section 12 can be compressed. In such a case, compressed image data can be decompressed in, for example, the writing section 22 or the reading section 24.

Embodiment 2

Another embodiment of the present invention will be discussed below. For convenience, members having functions identical to those of members explained in Embodiment 1 are given the same reference signs, and explanations thereof will be omitted. In Embodiment 2, a display driver writes, into a frame memory again, image data which has been read out from the frame memory immediately after an input mode is switched.

(Configuration of Display Device 2)

Figure 8:
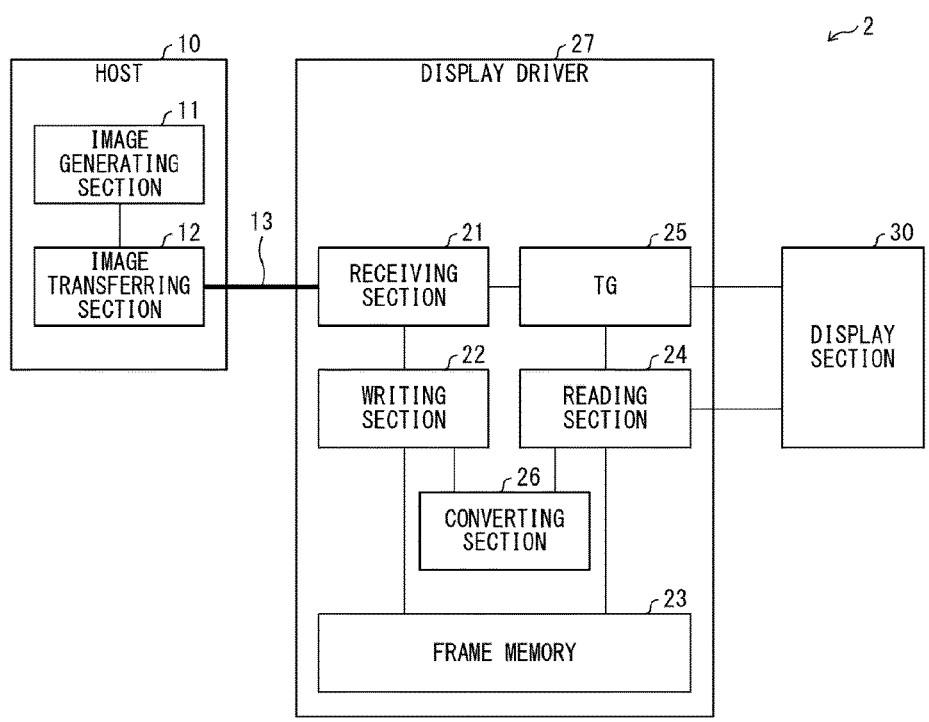
FIG. 8 is a block diagram illustrating a configuration of a display device in accordance with Embodiment 2 of the present invention.

FIG. 8 is a block diagram illustrating a configuration of a display device 2 in accordance with Embodiment 2. The display device 2 includes a host 10, a communication connecting section 13, a display driver 27, and a display section 30. The host 10, the communication connecting section 13, and the display driver 27 serve as a display control device that controls display operation of the display section 30. The host 10, the communication connecting section 13, and the display section 30 are identical in configuration to those of Embodiment 1.

The display driver 27 includes a receiving section 21, a writing section 22, a frame memory 23, a reading section 24, a TG 25, and a converting section 26. The converting section 26 converts a resolution of image data, which has been received from the reading section 24, (i) from a 4 k resolution into an FHD resolution or (ii) from the FHD resolution into the 4 k resolution. The converting section 26 supplies, to the writing section 22, image data whose resolution has been thus converted.

(Timing Chart of Image Data Transfer)

Figure 9:
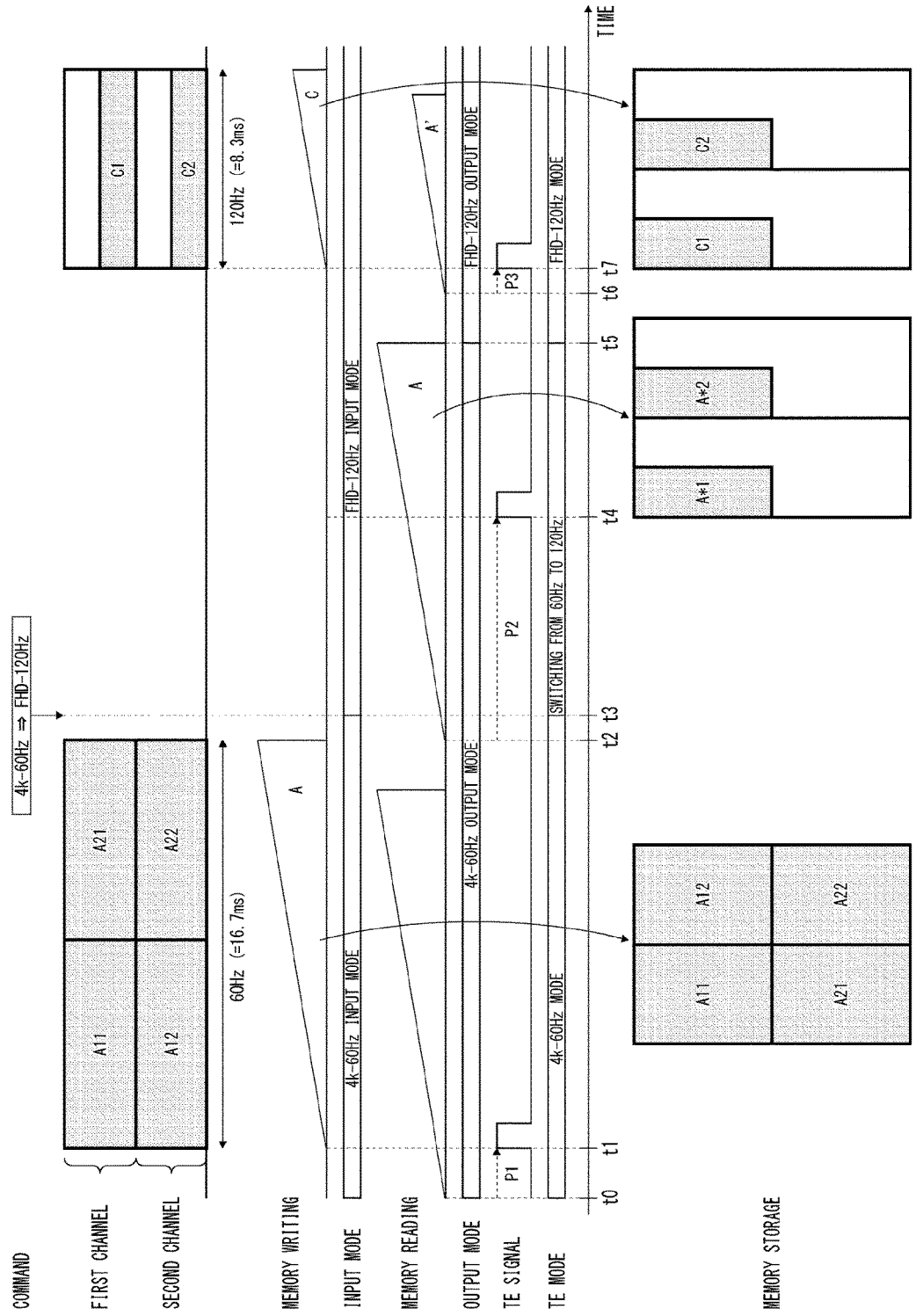
FIG. 9 is a view illustrating examples, in accordance with Embodiment 2, of timings of (i) transferring image data, (ii) writing the image data into a frame memory, and (iii) reading out the image data from the frame memory.

FIG. 9 is a view illustrating examples of timings of (i) transferring image data, (ii) writing the image data into the frame memory 23, and (iii) reading out the image data from the frame memory 23. Items and a horizontal axis illustrated in FIG. 9 are identical to those illustrated in FIG. 2. FIG. 9 is identical to FIG. 2 in processes which are carried out until a time point t3 at which the input mode is switched to "FHD-120 Hz". After the input mode is switched to "FHD-120 Hz", the TG 25 generates a TE signal at a time point t4.

In a case where a process of generating image data in the host 10 cannot be carried out in time due to an overload, (i) no image data may be transferred from the host 10 to the display driver 27 or (ii) transfer of the image data may be delayed. In a case where an output mode has been switched to "FHD-120 Hz" but the display driver 27 cannot receive image data having the FHD resolution, the display section 30 cannot carry out an appropriate display update.

Under the circumstances, the reading section 24 supplies, to the converting section 26, image data A which has been read out immediately after the input mode (resolution) is switched. The converting section 26 converts the image data A having the 4 k resolution into image data A' having the FHD resolution, and supplies, to the writing section 22, the image data A' which has been thus converted and has the FHD resolution. In a case where next image data having the FHD resolution is not transferred from the host 10, the writing section 22 receives the image data A' having the FHD resolution from the converting section 26, and writes the image data A' into the frame memory 23. The image data A' is constituted by pieces of data A*1 and A*2. The data A*1 corresponds to pieces of data A11 and A21, and the data A*2 corresponds to pieces of data A12 and A22. The writing section 22 writes the pieces of data A*1 and A*2 into the frame memory 23 in a manner similar to that in Embodiment 1. In a case of storing the image data A' having the FHD resolution, the frame memory 23 stops memory retaining operation in, out of all memory regions used in the 4 k resolution, memory regions which are not used in the FHD resolution. This makes it possible to reduce electric power consumed by the frame memory 23 while the display driver 27 is operating in an FHD resolution mode.

The reading section 24 starts reading out the image data A' from the frame memory 23 at a time point t6, and the image data A' is then displayed on the display section 30. The TG 25 generates a timing signal at a timing corresponding to the output mode of "FHD-120 Hz", and drives the display section 30 at a refresh rate of 120 Hz.

After that, the frame memory 23 can keep storing the image data A' until image data C having the FHD resolution is transferred from the host 10. While the image data A' is kept stored in the frame memory 23, the display driver 27 updates display on the display section 30 with use of the image data A'. When the image data C has been transferred from the host 10, the writing section 22 overwrites, with the image data C, the image data A' stored in the frame memory 23.

Similarly, in a case where a resolution is switched to a higher one, the converting section 26 can convert image data having the FHD resolution into image data having the 4 k resolution. In such a case, the display driver 27 can update display with use of the image data which has been converted and has the 4 k resolution, until next image data is transferred from the host 10. A resolution of image data can be converted into a higher one by, for example, a well-known interpolation technique. Note that, in a case where a frame rate is constant and a resolution is switched also, the display driver 27 can (i) convert a resolution of image data stored in the frame memory 23 and then (ii) cause the image data, whose resolution has been thus converted, to be stored in the frame memory 23 again.

Embodiment 3

Still another embodiment of the present invention will be discussed below. For convenience, members having functions identical to those of members explained in Embodiments 1 and 2 are given the same reference signs, and explanations thereof will be omitted. Embodiment 3 will discuss a case where (i) a frame rate is constant and (ii) only a resolution is switched. A display device 1 in accordance with Embodiment 3 is identical in configuration to that described in Embodiment 1.

(Timing Chart of Image Data Transfer)

Figure 10:
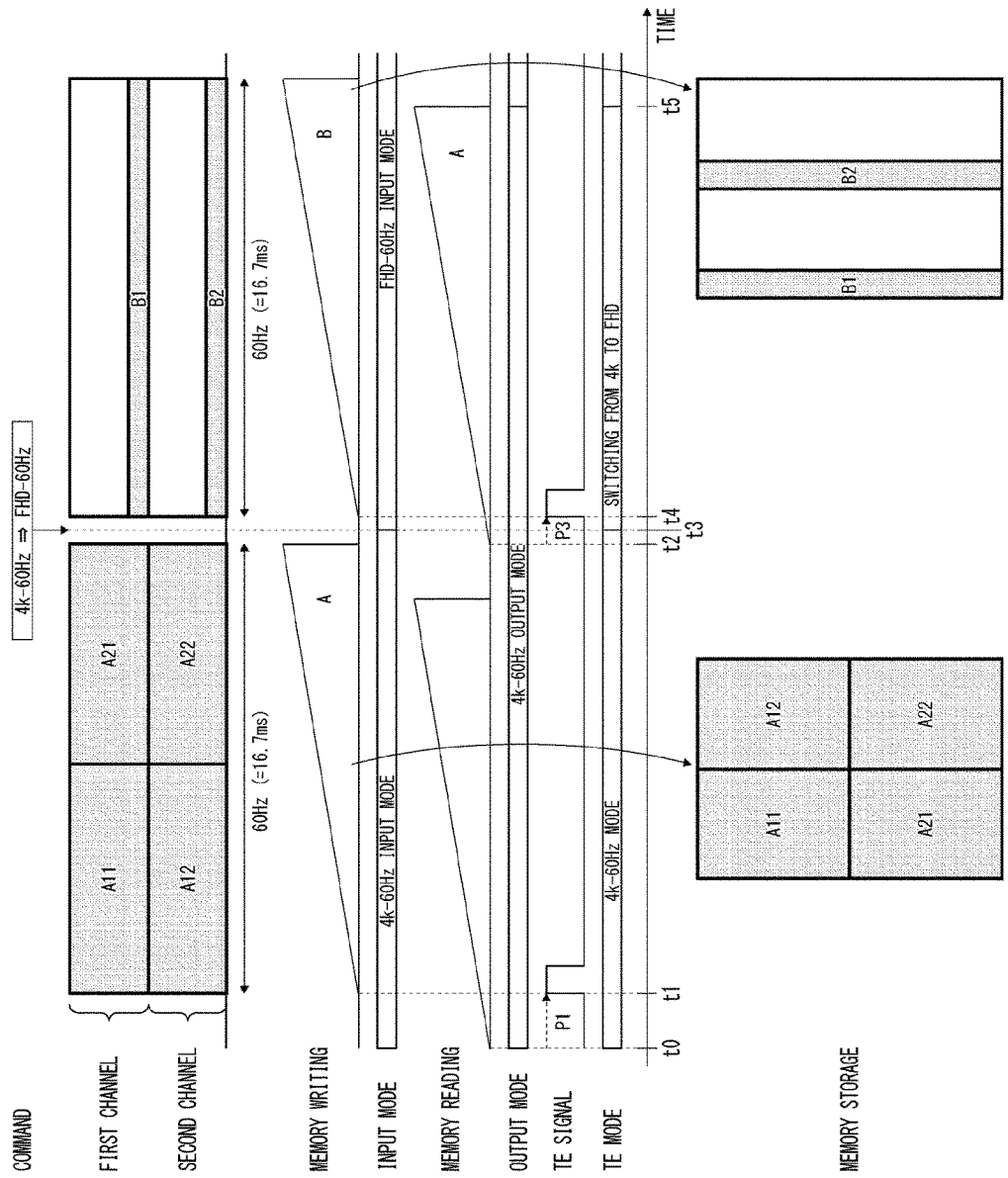
FIG. 10 is a view illustrating examples, in accordance with Embodiment 3, of timings of (i) transferring image data, (ii) writing the image data into a frame memory, and (iii) reading out the image data from the frame memory.
Figure 11:
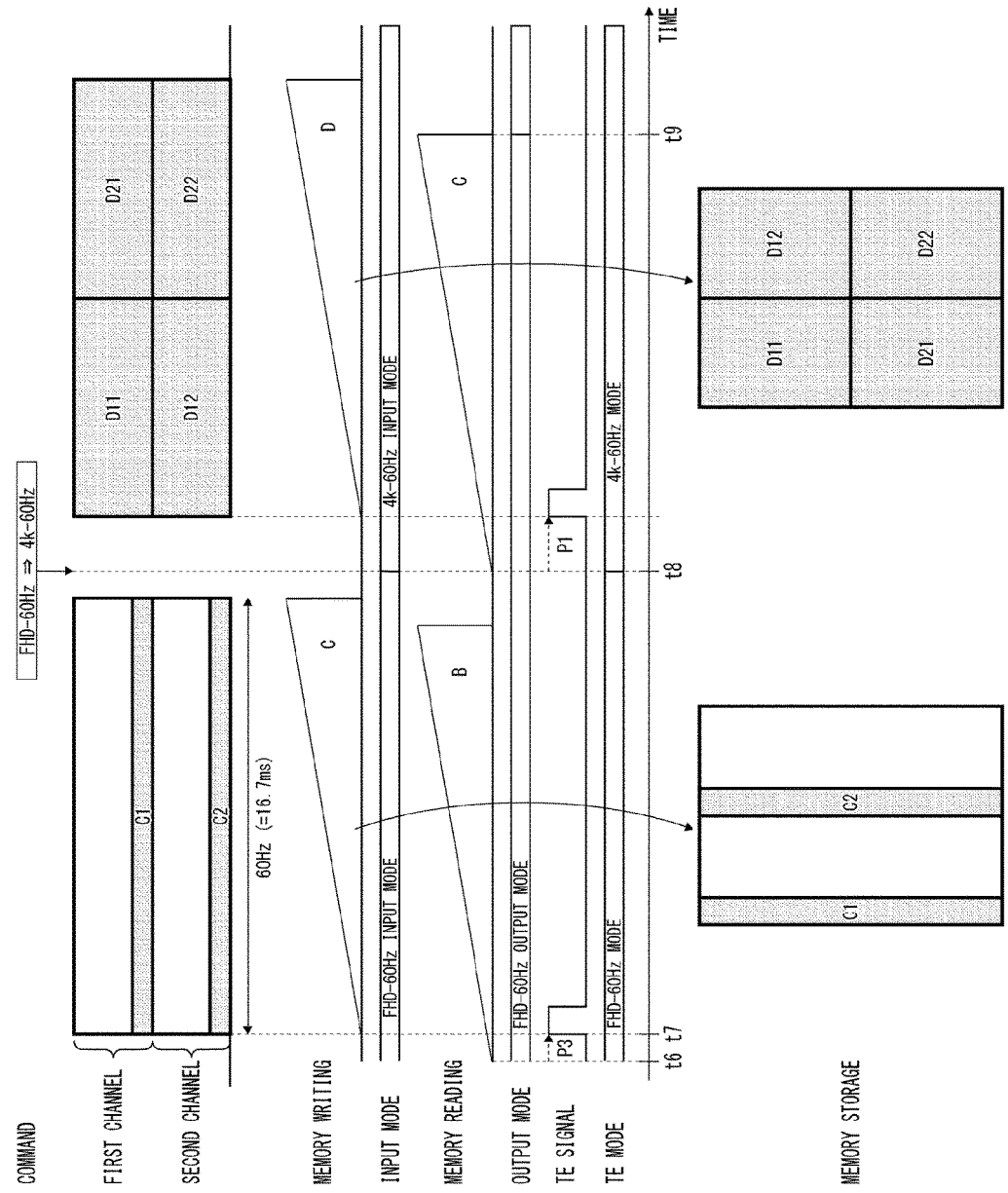
FIG. 11 is a view which is continued from FIG. 10 and illustrates examples of the timings of (i) transferring the image data, (ii) writing the image data into the frame memory, and (iii) reading out the image data from the frame memory 23.

FIG. 10 is a view illustrating examples of timings of (i) transferring image data, (ii) writing the image data into a frame memory 23, and (iii) reading out the image data from the frame memory 23. FIG. 11 is a view which is continued from FIG. 10 and illustrates examples of the timings of (i) transferring the image data, (ii) writing the image data into the frame memory 23, and (iii) reading out the image data from the frame memory 23. Items and a horizontal axis illustrated in FIGS. 10 and 11 are identical to those illustrated in FIG. 2. FIG. 10 is identical to FIG. 2 in processes which are carried out until a time point t2 at which a reading section 24 starts reading out image data A from the frame memory 23.

It is assumed that, at a time point t3, a display driver 20 receives, from a host 10, a command to switch an input mode from "4 k-60 Hz" to "FHD-60 Hz". In such a case, the frame rate does not vary and only the resolution is changed. Upon receipt of the command, a TG 25 immediately switches the input mode of the display driver 20 to "FHD-60 Hz". Meanwhile, the TG 25 switches an output mode to "FHD-60 Hz" after (i) the TG 25 receives a video start signal for image data B, which corresponds to a subsequent frame, from an image transferring section 12 via a receiving section 21 and (ii) reading-out of the image data A is completed. As such, there exists a period from t3 to t5 during which the input mode and the output mode do not match each other. In the period from t3 to t5 during which the input mode is lower in resolution than the output mode, the TG 25 sets a TE mode to "SWITCHING FROM 4 k TO FHD". When a period P3, which corresponds to the TE mode of "SWITCHING FROM 4 k TO FHD", has elapsed (at a time point t4) from start of reading out the image data A, the TG 25 generates a TE signal. In Embodiment 3, (a) a period until a TE signal is generated in accordance with the TE mode of "SWITCHING FROM 4 k TO FHD" is equal to (b) a period until a TE signal is generated in accordance with the TE mode of "FHD-60 Hz". Note, however, that those periods can have respective different lengths.

In a case where the input mode is "FHD-60 Hz", the image transferring section 12 stops (suspends) operation of some (in Embodiment 3, three-fourths) of the total of eight lanes of a communication connecting section 13. Specifically, in Embodiment 3, operation of three lanes out of four lanes of a first channel is suspended, and operation of three lanes out of four lanes of a second channel is suspended. Alternatively, for example, it is possible to (i) control two lanes of the first channel to operate and (ii) suspend operation of all lanes of the second channel. One-frame image data having the FHD resolution is one-fourth in size of the image data A having the 4 k resolution. Since the frame rate does not vary in Embodiment 3, an amount of data transferred per unit time is reduced to one-fourth. From this, it is possible to appropriately transfer image data even in a case where operation of three-fourths of all lanes is suspended. This makes it possible to reduce electric power that would be consumed by lanes whose operation is suspended.

Upon receipt of the TE signal at the time point t4, the image transferring section 12 (i) transmits a video start signal to the receiving section 21 and (ii) starts transferring image data B which corresponds to a subsequent frame and has the FHD resolution. The image data B is constituted by pieces of data B1 and B2. The data B1 is transferred to the receiving section 21 via one of the lanes of the first channel. The data B2 is transferred to the receiving section 21 via one of the lanes of the second channel. In storing the image data B, the frame memory 23 does not compactly store the image data B in an order of memory addresses but skips some of the memory addresses as illustrated in FIG. 10. How the frame memory 23 stores the image data B will be discussed later in detail. After reading-out of the image data A is completed in the input mode of "FHD-60 Hz", the frame memory 23 stops memory retaining operation in some of memory regions in which the image data B is not to be stored.

The reading section 24 starts reading out the image data B from the frame memory 23 at a time point t6 (see FIG. 11), and the image data B is then displayed on a display section 30. The TG 25 generates a timing signal at a timing corresponding to the output mode of "FHD-60 Hz", and drives the display section 30 at a refresh rate of 60 Hz.

When the period P3, which corresponds to the TE mode of "FHD-60 Hz", has elapsed from start of reading out the image data B (at the time point t6), the TG 25 generates a TE signal (at a time point t7). The period P3 is equal to or shorter than a period P1. Upon receipt of the TE signal (at the time point t7), the image transferring section 12 starts transferring image data C which corresponds to a subsequent frame and has the FHD resolution. The image data C is transferred and stored in the frame memory 23 in a manner similar to that for the image data B.

It is assumed that, at a time point t8, the display driver 20 receives, from the host 10, a command to switch the input mode from "FHD-60 Hz" to "4 k-60 Hz". Upon receipt of the command, the TG 25 immediately switches the input mode of the display driver 20 to "4 k-60 Hz". Meanwhile, the TG 25 switches the output mode to "4 k-60 Hz" after reading-out of the image data C which is stored in the frame memory 23 and has the FHD resolution is completed (at a time point t9). As such, there exists a period from t8 to t9 during which the input mode and the output mode do not match each other. In the period from t8 to t9 during which the input mode is higher in resolution than the output mode, the TG 25 sets the TE mode to "4 k-60 Hz" which is higher in resolution than "FHD-60 Hz". When the period P1, which corresponds to the TE mode of "4 k-60 Hz", has elapsed from start of reading out the image data C, the TG 25 generates a TE signal. Upon receipt of the TE signal, the image transferring section 12 starts transferring image data D which corresponds to a subsequent frame and has the 4 k resolution.

(Storage in Frame Memory)

FIG. 12 is a view illustrating an example of how the memory regions are related to the image data B having the FHD resolution. The way of viewing FIG. 12 is the same as that for FIG. 4. Pieces of pixel data in respective columns 1 through 270 in a row 1 of an image having the FHD resolution are stored, in the order of memory addresses, in respective regions to which memory addresses 1 through 270 are assigned. Meanwhile, regions to which respective memory addresses 271 through 1080 are assigned are skipped, and thus no data is stored in those regions. Pieces of pixel data in respective columns 271 through 540 in the row 1 of the image having the FHD resolution are stored, in the order of memory addresses, in respective regions to which memory addresses 2161 through 2430 are assigned. That is, the pieces of pixel data in the respective columns 1 through 540 in the row 1 of the image having the FHD resolution are stored in respective regions in which (i) pieces of pixel data in columns 1 through 270 in a row 1 of an image having the 4 k resolution and (ii) pieces of pixel data in the columns 1 through 270 in a row 2 of the image having the 4 k resolution are to be stored. Similarly, pieces of pixel data in respective columns 541 through 1080 in the row 1 of the image having the FHD resolution are stored in respective regions in which (i) pieces of pixel data in columns 541 through 810 in the row 1 of the image having the 4 k resolution and (ii) pieces of pixel data in the columns 541 through 810 in the row 2 of the image having the 4 k resolution are to be stored. That is, pieces of pixel data of one (1) row of the image having the FHD resolution are stored, while skipping some of the memory addresses, in regions in which pieces of pixel data of two rows of the image having the 4 k resolution are to be stored. For example, pieces of pixel data in a row 1920 of the image having the FHD resolution are stored at a position corresponding to pieces of pixel data of rows 3839 and 3840 of the image having the 4 k resolution. In storing the image data B having the FHD resolution, the frame memory 23 stops memory retaining operation in, out of all memory regions used in the 4 k resolution, memory regions (i.e., unhatched regions) which are not used in the FHD resolution.

A writing section 22 maintains (i) an association between the first channel and memory regions into which data transferred via the first channel is written and (ii) an association between the second channel and memory regions into which data transferred via the second channel is written, even in a case where a resolution changes. Data of an nth row of an image having the FHD resolution is stored in memory regions in which (i) data of a (2n−1)th row of an image having the 4 k resolution and (ii) data of a 2nth row of the image having the 4 k resolution are to be stored. For example, the frame memory 23 stores pixel data, which is of a lowermost row of an image having the FHD resolution, at a position corresponding to pixel data of a lowermost row of an image having the 4 k resolution.

Figure 13:
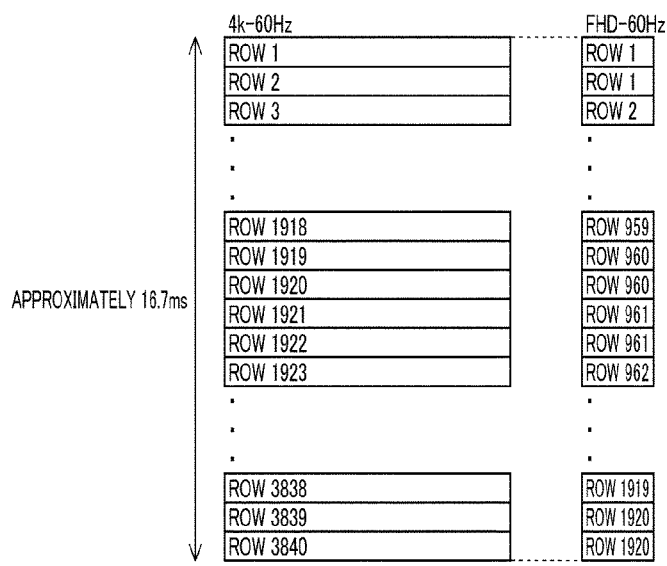
FIG. 13 is a view illustrating timings at which a reading section in accordance with Embodiment 3 reads out data.

FIG. 13 is a view illustrating timings at which the reading section reads out data. In the output mode of "FHD-60 Hz", (i) the number of rows of pixels in an image is a half but (ii) a period during which one-frame image data is read out is the same, as compared with the output mode "4 k-60 Hz". It follows that, in the output mode of "FHD-60 Hz", the reading section 24 reads out pixel data of one (1) row of the image during a period which corresponds to a period during which pixel data of two rows of the image is read out in the output mode of "4 k-60 Hz". This makes it possible to control the reading section 24 to read out, at identical timings, pieces of data stored at respective memory addresses, regardless of difference in output mode. Furthermore, the reading section 24 can read out data by similar operation regardless of the output mode. It is therefore possible to reduce a circuit scale of the reading section 24 that is compatible with two different resolutions.

[Software Implementation Example]

Control blocks of the display devices 1 and 2 (in particular, the image generating section 11, the image transferring section 12, the receiving section 21, the writing section 22, the reading section 24, the TG 25, and the converting section 26) can be realized by a logic circuit (hardware) provided in an integrated circuit (IC chip) or the like or can be alternatively realized by software as executed by a central processing unit (CPU).

In the latter case, each of the display devices 1 and 2 includes: a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Recap]

A display control device in accordance with a first aspect of the present invention includes: a display driver (20, 27); an image transferring section (12) configured to transfer image data to the display driver; and a first transmission line and a second transmission line each of which connects the display driver with the image transferring section, in a case of transferring image data having a first resolution, the image transferring section transferring the image data having the first resolution to the display driver via the first transmission line and the second transmission line, and in a case of transferring image data having a second resolution which is lower than the first resolution, the image transferring section (i) stopping operation of the first transmission line and (ii) transferring the image data having the second resolution to the display driver via the second transmission line. According to the above configuration, the operation of the first transmission line, which is one of transmission lines of the display control device, is stopped in a case where the image data having the second resolution which is the lower resolution is to be transferred. With the configuration, it is possible to reduce electric power consumption by appropriately switching a resolution and a frame rate of the image data.

The display control device in accordance with a second aspect of the present invention can be configured such that, in the first aspect of the present invention, the display driver (23) includes a frame memory which is capable of storing the image data having the first resolution; and in a case of storing the image data having the second resolution, the frame memory skips some of memory addresses. According to the above configuration, it is possible to shorten a period of input wait for preventing tearing which may occur when the resolution is switched.

The display control device in accordance with a third aspect of the present invention can be configured such that, in the second aspect of the present invention, the frame memory stores image data, which is of a lowermost row of an image having the second resolution, at a position corresponding to image data of a (B/A)th raw of an image having the first resolution, where a frame rate of the image data having the second resolution is A times that of the image data having the first resolution, and B is the number of rows in the first resolution. According to the above configuration, it is possible to control the display driver to operate such that an association between (i) the second transmission line and (ii) a memory region into which image data transferred via the second transmission line is stored is maintained regardless of the resolution of the image data. This eliminates the necessity of largely changing reading operation with respect to the frame memory depending on the resolution of the image data. It is therefore possible to reduce a circuit scale of the display driver.

The display control device in accordance with a fourth aspect of the present invention can be configured such that, in the second aspect of the present invention, in a case where a frame rate is constant, the frame memory stores data, which is of a lowermost row of an image having the second resolution, at a position corresponding to data of a lowermost row of an image having the first resolution. According to the above configuration, it is possible to read, at the respective same timings, pieces of data stored at respective memory addresses in the frame memory, regardless of the resolution of the image data. It is therefore possible to reduce the circuit scale of the display driver.

The display control device in accordance with a fifth aspect of the present invention can be configured such that, in any one of the second through fourth aspects of the present invention, when (i) the first resolution is switched to the second resolution and (ii) a first frame rate is switched to a second frame rate which is C times (C>1) the first frame rate, the display driver reads out (1−1/C) of the image data which has the first resolution and is stored in the frame memory and then transmits a transfer timing signal to the image transferring section; and upon receipt of the transfer timing signal, the image transferring section transfers image data having the second frame rate to the display driver. According to the above configuration, it is possible to prevent tearing which may occur when a resolution and a frame rate are switched.

The display control device in accordance with a sixth aspect of the present invention can be configured such that, in the first aspect of the present invention, the display driver includes a frame memory which is capable of storing the image data having the first resolution; and when a resolution of the image data to be transferred is switched from the first resolution to the second resolution, the display driver reads out the image data which has the first resolution and is stored in the frame memory, convert s the image data having the first resolution into image data having the second resolution, and causes the image data, whose resolution has been thus converted into the second resolution, to be stored in the frame memory. According to the above configuration, the display driver can carry out display control with use of the image data whose resolution has been converted into the second resolution, even in a case where (i) no image data having the second resolution is transferred from the image transferring section or (ii) transfer of such image data is delayed.

The display control device in accordance with a seventh aspect of the present invention can be configured such that, in the first aspect of the present invention, the display driver includes a frame memory which is capable of storing the image data having the first resolution; and during a period of storing the image data having the second resolution, the frame memory stops memory retaining operation in some of memory regions. According to the above configuration, it is possible to reduce electric power consumed for the memory retaining operation in memory regions which may not be used depending on the resolution.

The display control device in accordance with an eighth aspect of the present invention can be configured such that, in the seventh aspect of the present invention, the frame memory stops the memory retaining operation in the some of the memory regions by stopping (i) power supply to the some of the memory regions, (ii) supply of a clock signal to the some of the memory regions, or (iii) refresh operation in the some of the memory regions.

The display control device in accordance with a ninth aspect the present invention can be configured to further include, in any one of the first through eighth aspect of the present invention, a first transmission channel including the first transmission line and the second transmission line; and a second transmission channel including a third transmission line and a fourth transmission line, in a case of transferring the image data having the first resolution, the image transferring section transferring the image data having the first resolution to the display driver via the first transmission line, the second transmission line, the third transmission line, and the fourth transmission line, and in a case of transferring the image data having the second resolution, the image transferring section (i) stopping operation of the first transmission line and the third transmission line and (ii) transferring the image data having the second resolution to the display driver via the second transmission line and the fourth transmission line. According to the above configuration, the image data is transferred via two transmission channels also in a case where the image data has the second resolution which is the lower resolution. This makes it possible to control the display driver to operate such that an association between (i) each transmission channel and (ii) a memory region into which image data transferred via that transmission channel is stored is maintained. For example, it is possible to control the display driver to concurrently write, into respective corresponding regions of the frame memory, pieces of data transferred via the transmission channels, regardless of the resolution. This eliminates the necessity of largely changing the reading operation with respect to the frame memory depending on the resolution of the image data.

The display control device in accordance with a tenth aspect of the present invention can be configured such that, in any one of the first through ninth aspects of the present invention, the image data indicates an image for one (1) frame; and the image transferring section transfers the image data at a timing corresponding to a frame rate of the image.

The display control device in accordance with an eleventh aspect of the present invention can be configured to further include, in any one of the first through tenth aspect of the present invention, an image generating section (11), in a case where a static image is to be displayed, the image generating section generating the image data having the first resolution, and in a case where a moving image is to be displayed, the image generating section generating the image data having the second resolution. According to the above configuration, (i) the first resolution which is the higher resolution can be used in a case where a static image, from which a level of the resolution is likely to be visually recognized, is displayed, and (ii) the second resolution which is the lower resolution can be used in a case where a moving image, from which the level of the resolution is unlikely to be visually recognized, is displayed. This makes it possible to effectively reduce electric power consumption.

A display device (1, 2) in accordance with a twelfth aspect of the present invention can be configured to include: the display control device in accordance with any one of the first through eleventh aspects of the present invention; and a display section (30) configured to display an image, the display section being driven by the display driver.

A method of controlling a display control device in accordance with a thirteenth aspect of the present invention is a method of controlling a display control device which includes (i) a display driver, (ii) an image transferring section configured to transfer image data to the display driver, and (iii) a first transmission line and a second transmission line each of which connects the display driver with the image transferring section, in which: in a case where image data having a first resolution is transferred, the image data having the first resolution is transferred from the image transferring section to the display driver via the first transmission line and the second transmission line; and in a case where image data having a second resolution which is lower than the first resolution is transferred, operation of the first transmission line is stopped and the image data having the second resolution is transferred from the image transferring section to the display driver via the second transmission line.

Each of the display control devices in accordance with the aspects of the present invention may be realized by a computer. In this case, the present invention also encompasses (i) a control program for a display control device which program causes a computer to operate as sections (software elements) of the display control device so as to realize the display control device by the computer, and (ii) a computer-readable storage medium in which the control program is stored.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 1, 2: Display device
10: Host (display control device)
11: Image generating section
12: Image transferring section
13: Communication connecting section (display control device)
20, 27: Display driver (display control device)
23: Frame memory

The invention claimed is:

1. A display control device, comprising:
a display driver;
an image transferring section configured to transfer image data to the display driver; and
a first transmission line and a second transmission line each of which connects the display driver with the image transferring section,
in a case of transferring image data having a first resolution, the image transferring section transferring the image data having the first resolution to the display driver via the first transmission line and the second transmission line, and
in a case of transferring image data having a second resolution which is lower than the first resolution, the image transferring section (i) stopping operation of the first transmission line and (ii) transferring the image data having the second resolution to the display driver via the second transmission line, wherein the display driver includes a frame memory which is capable of storing the image data having the first resolution, and wherein in a case of storing the image data having the second resolution, the frame memory skips some of memory addresses.

2. The display control device as set forth in claim 1, wherein:
the frame memory stores image data, which is of a lowermost row of an image having the second resolution, at a position corresponding to image data of a (B/A)th raw of an image having the first resolution, where a frame rate of the image data having the second resolution is A times that of the image data having the first resolution, and B is the number of rows in the first resolution.

3. The display control device as set forth in claim 1, wherein:
in a case where a frame rate is constant, the frame memory stores data, which is of a lowermost row of an image having the second resolution, at a position corresponding to data of a lowermost row of an image having the first resolution.

4. The display control device as set forth in claim 1, wherein:
when (i) the first resolution is switched to the second resolution and (ii) a first frame rate is switched to a second frame rate which is C times (C>1) the first frame rate, the display driver reads out (1−1/C) of the image data which has the first resolution and is stored in the frame memory and then transmits a transfer timing signal to the image transferring section; and
upon receipt of the transfer timing signal, the image transferring section transfers image data having the second frame rate to the display driver.

5. The display control device as set forth in claim 1, further comprising:
a first transmission channel including the first transmission line and the second transmission line; and
a second transmission channel including a third transmission line and a fourth transmission line,
in a case of transferring the image data having the first resolution, the image transferring section transferring the image data having the first resolution to the display driver via the first transmission line, the second transmission line, the third transmission line, and the fourth transmission line, and
in a case of transferring the image data having the second resolution, the image transferring section (i) stopping operation of the first transmission line and the third transmission line and (ii) transferring the image data having the second resolution to the display driver via the second transmission line and the fourth transmission line.

6. The display control device as set forth in claim 1, wherein:
the image data indicates an image for one (1) frame; and
the image transferring section transfers the image data at a timing corresponding to a frame rate of the image.

7. The display control device as set forth in claim 1, further comprising:
an image generating section,
in a case where a static image is to be displayed, the image generating section generating the image data having the first resolution, and
in a case where a moving image is to be displayed, the image generating section generating the image data having the second resolution.

8. A display device, comprising:
a display control device recited in claim 1; and
a display section configured to display an image, the display section being driven by the display driver.

9. A non-transitory computer-readable storage medium storing therein a control program for causing a computer to function as a display control device recited in claim 1, the control program causing the computer to function as the image transferring section.

10. A display control device comprising:
a display driver including a frame memory which is capable of storing image data having a first resolution;
an image transferring section configured to transfer image data to the display driver; and
a first transmission line and a second transmission line each of which connects the display driver with the image transferring section, wherein
in a case of transferring the image data having the first resolution, the image transferring section transfers the image data having the first resolution to the display driver via the first transmission line and the second transmission line, and
in a case of transferring image data having a second resolution which is lower than the first resolution, the image transferring section (i) stops operation of the first transmission line and (ii) transfers the image data having the second resolution to the display driver via the second transmission line, wherein when a resolution of the image data to be transferred is switched from the first resolution to the second resolution, the display driver reads out the image data which has the first resolution and is stored in the frame memory, converts the image data having the first resolution into image data having the second resolution, and causes the image data, whose resolution has been thus converted into the second resolution, to be stored in the frame memory.

11. A display control device comprising:

a display driver including a frame memory which is capable of storing image data having a first resolution;

an image transferring section configured to transfer image data to the display driver; and a first transmission line and a second transmission line each of which connects the display driver with the image transferring section, wherein in a case of transferring the image data having the first resolution, the image transferring section transfers the image data having the first resolution to the display driver via the first transmission line and the second transmission line, and in a case of transferring image data having a second resolution which is lower than the first resolution, the image transferring section (i) stops operation of the first transmission line and (ii) transfers the image data having the second resolution to the display driver via the second transmission line, wherein during a period of storing the image data having the second resolution, the frame memory stops memory retaining operation in some of memory regions.

12. The display control device as set forth in claim 11, wherein:

the frame memory stops the memory retaining operation in the some of the memory regions by stopping (i) power supply to the some of the memory regions, (ii) supply of a clock signal to the some of the memory regions, or (iii) refresh operation in the some of the memory regions.

13. A method of controlling a display control device which includes (i) a display driver, (ii) an image transferring section configured to transfer image data to the display driver, and (iii) a first transmission line and a second transmission line each of which connects the display driver with the image transferring section, wherein:

in a case where image data having a first resolution is transferred, the image data having the first resolution is transferred from the image transferring section to the display driver via the first transmission line and the second transmission line; and in a case where image data having a second resolution which is lower than the first resolution is transferred, operation of the first transmission line is stopped and the image data having the second resolution is transferred from the image transferring section to the display driver via the second transmission line, wherein the display driver includes a frame memory which is capable of storing the image data having the first resolution, and wherein in a case of storing the image data having the second resolution, the frame memory skips some of memory addresses.

* * * * *